(12) United States Patent
Kawasaki et al.

(10) Patent No.: US 7,397,570 B2
(45) Date of Patent: Jul. 8, 2008

(54) INTERFEROMETER AND SHAPE MEASURING METHOD

(75) Inventors: Kazuhiko Kawasaki, Ushiku (JP); Yoshimasa Suzuki, Tsukuba (JP); David W. Sesko, Woodinville, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 87 days.

(21) Appl. No.: 11/433,485

(22) Filed: May 15, 2006

(65) Prior Publication Data

US 2006/0262320 A1  Nov. 23, 2006

(30) Foreign Application Priority Data

May 18, 2005 (JP) ............... 2005-145035
Feb. 7, 2006 (JP) ............... 2006-029167

(51) Int. Cl.
*G01B 11/02* (2006.01)

(52) U.S. Cl. ............... 356/512; 356/515
(58) Field of Classification Search .......... 356/512–515
See application file for complete search history.

(56) References Cited

U.S. PATENT DOCUMENTS 5,398,113 A * 3/1995 de Groot ............... 356/497

2004/0190002 A1  9/2004 Schulte et al.
2005/0030550 A1  2/2005 Nahum

FOREIGN PATENT DOCUMENTS

| EP | 1 505 365 A2 | 2/2005 |
|----|-----|-----|
| JP | A 2-287107 | 11/1990 |
| JP | A 2001-91223 | 4/2001 |

OTHER PUBLICATIONS

Marron et al., "Three-dimensional imaging using a tunable laser source," Optical Engineering, vol. 39, No. 1, pp. 47-51, Jan. 2000.
Kuwamura et al., "Wavelength scanning profilometry for real-time surface shape measurement," Applied Optics, vol. 36, No. 19, pp. 4473-4482, Jul. 1997.
Yamaguchi et al., "Surface topography by wavelength scanning interferometry," Optical Engineering, vol. 39, No. 1, pp. 40-46, Jan. 2000.

* cited by examiner

*Primary Examiner*—Tarifur R Chowdhury
*Assistant Examiner*—Jonathon D Cook
(74) *Attorney, Agent, or Firm*—Oliff & Berridge, PLC

(57) ABSTRACT

A wavelength-variable light source is configured to emit a light with a wavelength ($\lambda$), which is variable within a scan width ($\Delta\lambda$). An interferometer has a coherent length ($\Delta L$), which is determinable from ($\Delta\lambda$) and ($\lambda$). A controller determines an appropriate magnitude of the scan width ($\Delta\lambda$) while a CCD camera captures a fringe image in an exposure time (Te), which is set longer than a time for wavelength scanning.

18 Claims, 8 Drawing Sheets

INTERFEROMETER AND SHAPE MEASURING METHOD

CROSS REFERENCE TO RELATED APPLICATION

This application is based upon and claims the benefit of priority from the prior Japanese Patent Application No. 2005-145035, filed on May 18, 2005, and No. 2006-029167, filed on Feb. 7, 2006, the entire contents of which are incorporated herein by reference.

BACKGROUND OF THE INVENTION

1. Field of the Invention

The present invention relates to an interferometer for use in measurement of the shape of a measuring object based on interference fringes, and a shape measuring method using the interferometer.

2. Description of the Related Art

An interferometer for use in measurement of flatness generally incorporates a high-coherence light source such as a He—Ne laser. On measurement of a parallel glass substrate, however, a light reflected from a front surface to be measured (a target surface) and a light reflected from an undesired, rear surface may interfere with each other, resulting in interference noises. The use of a low-coherence light source may prevent a rear-surface reflection from causing interference noises if a coherent length $\Delta L$ is determined sufficiently shorter than an optical path length d of light traveling between the front/rear surfaces (see JP-A 2001-91223).

On the other hand, a coherent length $\Delta L$ determined too shorter is not available in measurement unless a difference between an optical path length of a measurement light and an optical path length of a reference light (an optical path difference) is determined less than the coherent length $\Delta L$. Therefore, this makes it difficult to measure a target surface with large waviness and requires strict efforts by a skilled worker on setting of a measuring object.

SUMMARY OF THE INVENTION

The present invention has been made in consideration of the above subject and has an object to provide an interferometer capable of avoiding interference noises and easily adjusting the arrangement of a measuring object. A shape measuring method using the interferometer is also provided.

In one aspect the present invention provides an interferometer, comprising: a wavelength-variable light source configured to emit a light with a variable wavelength; a light splitting/synthesizing member operative to split the light from the wavelength-variable light source into a measurement light to be led to a measuring object and a reference light to be led to a reference surface, and to synthesize the reference light reflected from the reference surface and the measurement light reflected from the measuring object to provide a synthesized light; an imaging unit operative to image an interference fringe image formed of the synthesized light in a certain exposure time; a controller operative to control the wavelength-variable light source to vary the wavelength of the emitted light within a certain wavelength range in the certain exposure time; and a shape computation unit operative to analyze the interference fringe image integrated in relation to the variations in wavelength within the certain wavelength range to compute the shape of the measuring object.

In another aspect the present invention provides a shape measuring method, comprising: emitting a light while giving variations in wavelength; splitting the light into a measurement light to be led to a measuring object and a reference light to be led to a reference surface; synthesizing the reference light reflected from the reference surface and the measurement light reflected from the measuring object to provide a synthesized light; imaging an interference fringe image formed of the synthesized light in a certain exposure time; controlling the wavelength-variable light source to vary the wavelength of the emitted light within a certain wavelength range in the certain exposure time; and analyzing the interference fringe image integrated in relation to the variations in wavelength within the certain wavelength range to compute the shape of the measuring object.

The present invention provides an interferometer capable of avoiding interference noises and easily adjusting the arrangement of a measuring object. A shape measuring method using the interferometer is also provided.

BRIEF DESCRIPTION OF THE DRAWINGS

Preferred embodiments of the present invention will now be described below with reference to the accompanying drawings, in which.

DETAILED DESCRIPTION OF THE INVENTION

Embodiments of the present invention will be described in detail next with reference to the drawings.

FIRST EMBODIMENT

Figure 1:
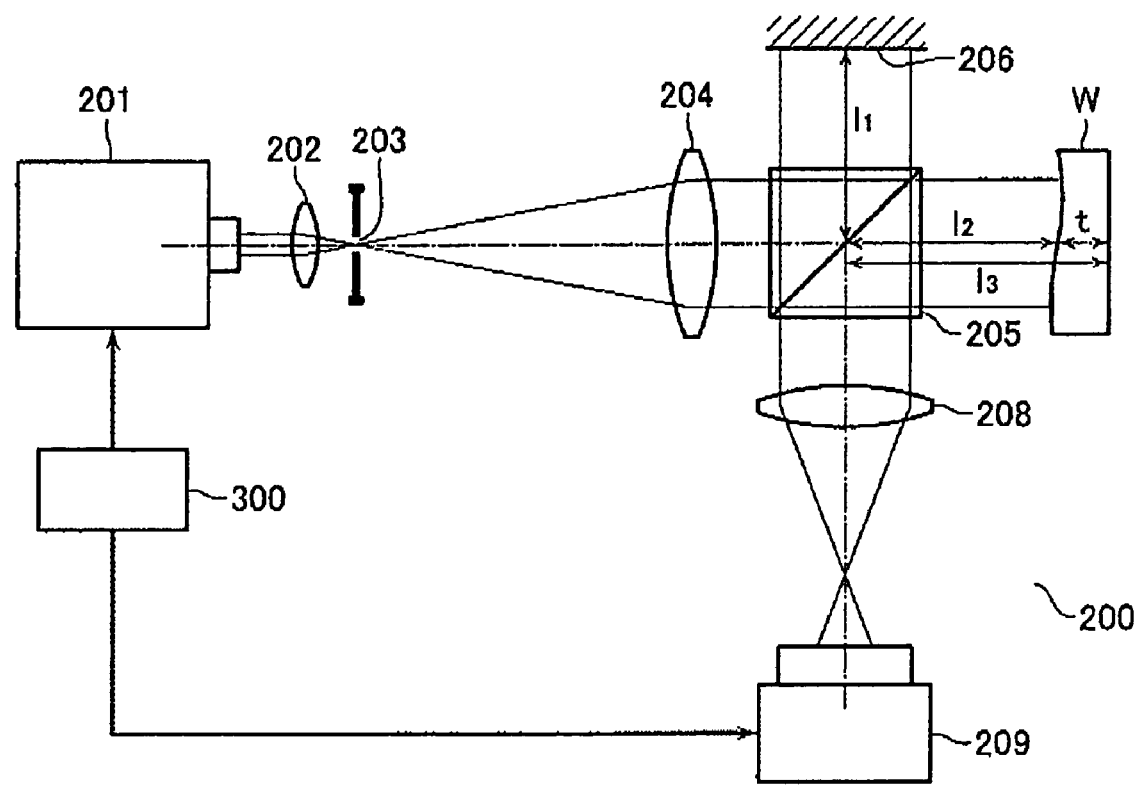
FIG. 1 is a schematic diagram of a configuration of an interferometer 200 according to a first embodiment of the present invention.

FIG. 1 is a schematic diagram of a configuration of an interferometer according to a first embodiment of the present invention. The interferometer 200 shown in FIG. 1 comprises a wavelength-variable light source 201, a condenser lens 202, a pinhole 203, a collimator lens 204, a beam splitter 205, a reference mirror 206, a lens 208, and a CCD camera 209. A measuring object W herein is a transmissive object with a thickness of t, having a front surface that is a target surface and a rear surface that reflects a light.

The wavelength-variable light source 201 is a laser light source adjusted to emit a laser light in a single longitudinal mode, of which center wavelength $\lambda_0$ is controlled by a control signal from a controller 300 to vary over a wavelength scan width, then wavelength $\lambda$ of the wavelength-variable light source 201 is varied within $\lambda=\lambda_0\pm\Delta\lambda/2$, where $\Delta\lambda$ denotes a wavelength scan width (for wavelength scanning within $\pm\Delta\lambda/2$ about the wavelength $\lambda_0$). The controller 300 controls the center wavelength $\lambda_0$ of the light emitted from the wavelength-variable light source 201 in accordance with the thickness t of the measuring object W, and a coherent length $\Delta L$ that should be determined from an optical path difference between a reference light and a measurement light.

The light from the wavelength-variable light source 201 is condensed through the lens 202 and filtered spatially by the pinhole 203. The light from a point source of light formed of the pinhole 203 is collimated into a paralleled light and led into the beam splitter 205. The paralleled light led into the beam splitter 205 is partly reflected toward the reference mirror 206 as the reference light, and the remainder is transmitted therethrough as the measurement light that travels toward the measuring object W.

The reference light reflected from the reference mirror 206 and the measurement light reflected from the front surface (target surface) of the measuring object W are reflected from or transmitted through the beam splitter 205 and synthesized. Through imaging optics such as the lens 208, an interference fringe image depending on the synthesized light is focused onto an imaging surface of the CCD camera 209, which captures the interference fringe image.

The CCD camera 209 is controlled by the controller 300 to have such an exposure time Te that is made longer than a time Tc required for the wavelength-variable light source 201 to vary the wavelength $\lambda$ by the wavelength scan width $\Delta\lambda$. For example, if the synthesized intensity distribution is a normal distribution when the wavelength of the wavelength-variable light source 201 is scanned for integrating exposure, then the coherent length $\Delta L$ can be briefly determined by the wavelength scan width $\Delta\lambda$ as follows.

$$\Delta L=\lambda^2/(2\cdot\Delta\lambda) \quad \text{[Expression 1]}$$

A controlled magnitude of the wavelength scan width $\Delta\lambda$ allows the coherent length $\Delta L$ to have an arbitrarily set magnitude. Namely, on rough adjustment of the position of the measuring object W, the coherent length $\Delta L$ can be elongated to facilitate the adjustment of the position. In addition, after completion of the rough adjustment of the position, the coherent length $\Delta L$ can be shortened for fine adjustment and measurement thereof based on, for example, the thickness of the measuring object W. Accordingly, interference noises caused from the rear-surface reflection can be removed for accurate measurements. The controller 300 determines the wavelength scan width $\Delta\lambda$ to control the wavelength-variable light source 201 in accordance with the coherent length $\Delta L$ required. If the synthesized intensity distribution is not regarded as a normal distribution when the wavelength-variable light source 201 is subjected to wavelength scanning and integrating exposure, then the coherent length $\Delta L$ may be represented by a more complicated function than the [Expression 1]. In such a case, the coherent length $\Delta L$ can be computed in accordance with that function.

The following description is given to the measurement principle of the measuring object W, from which interference noises are removed. First, an optical path length is defined as shown in FIG. 1. Namely, an optical path length of the reference light (a length of the optical path that reflects at the beam splitter 205, then reflects at the reference mirror 206 and finally returns to the beam splitter 205) is defined as $l_1$. In addition, an optical path length of the measurement light (a length of the optical path that passes through the beam splitter 205, then reflects at the target surface of the measuring object W and finally returns to the beam splitter 205) is defined as $l_2$. Further, an optical path length of noise light (a length of the optical path that passes through the beam splitter 205, then reflects at the rear surface of the measuring object W and finally returns to the beam splitter 205) is defined as $l_3$.

In this case, the interference intensity of a synthesized light of the reference light, the measurement light and the noise light can be represented by the following expression. When the reference light, the measurement light and the noise light are represented with complex amplitude, the amplitude is shown as simplified as one. The interference fringe image has a two-dimensional distribution of light intensity though the light intensity of a certain point is shown as simplified as one-dimension in the following expression.

$$I = Rc[\{\exp(ikl_1) + \exp(ikl_2) + \exp(ikl_3)\} \cdot \quad \text{[Expression 2]}$$
$$\{\exp(ikl_1) + \exp(ikl_2) + \exp(ikl_3)\}'] =$$
$$Re[3 + 2\exp\{ik(l_2 - l_1)\} + 2\exp\{ik(l_3 - l_2)\} +$$
$$2\exp\{ik(l_3 - l_1)\}]$$

where k denotes the wave number ($=2\pi/\lambda$).

When the difference between $l_2$ and $l_1$ and the difference between $l_3$ and $l_1$ are designated with $\Delta l_{21}$ and $\Delta l_{31}$, respectively, the [Expression 2] can be expressed as the following expression.

$$I = 3 + 2\cos(k\Delta l_{21}) + 2\cos\{k(\Delta l_{31} - \Delta l_{21})\} + 2\cos(k\Delta l_{31}) = \quad \text{[Expression 3]}$$
$$3 + 2\cos(k\Delta l_{21}) + 2\cos(k\Delta l_{31}) +$$
$$2\cos(k\Delta l_{21})\cos(k\Delta l_{31}) + 2\sin(k\Delta l_{21})\sin(k\Delta l_{31})$$

When the wavelength $\lambda$ is varied over the wavelength scan width $\Delta\lambda$ in the exposure time Te of the CCD camera 209, interference intensity $I_{int}$ can be obtained as integrated intensity of interference fringe images caused from respective wavelengths. The interference intensity $I_{int}$ can be represented by the following expression.

$$I_{int} = \int I dk = \int [3 + 2\cos(k\Delta l_{21}) + 2\cos(k\Delta l_{31}) + \quad \text{[Expression 4]}$$
$$2\cos(k\Delta l_{21})\cos(k\Delta l_{31}) + 2\sin(k\Delta l_{21})\sin(k\Delta l_{31})]dk$$

It is herein taken into consideration that the position of the measuring object W is adjusted such that the optical path length $l_1$ of the reference light is made almost equal to the optical path length $l_2$ of the measurement light. In this case, of the terms in [Expression 4], the term that only contains $\Delta l_{21}$, like the second term, indicates intensity almost constant regardless of the wavelength, and thus intensity variable in accordance with the shape of the measuring object W.

On the other hand, as for the term that only contains $\Delta l_{31}$, like the third term, the intensity is variable in accordance with wavelength scanning but, when it is integrated, it indicates averaged intensity, and thus intensity unrelated to $\Delta l_{31}$. Therefore, the third term is a term that indicates a bias in the interference intensity $I_{int}$. The first, constant term is a term that indicates a bias as well. The fourth and fifth terms each indicate intensity resulted from the intensity variable in accordance with the shape of the measuring object W multiplied by a bias component. Therefore, [Expression 4] can be represented as simplified as the following expression.

$$I_{int} = B + A \cos(k \Delta l_{21}) \qquad \text{[Expression 5]}$$

where B denotes a bias, and A amplitude.

Therefore, when wavelength scanning is carried out over the wavelength scan width $\Delta \lambda$ to obtain an integrated interference fringe image, measurement of interference fringes can be executed under no influence of the rear-surface reflection.

Figure 2:
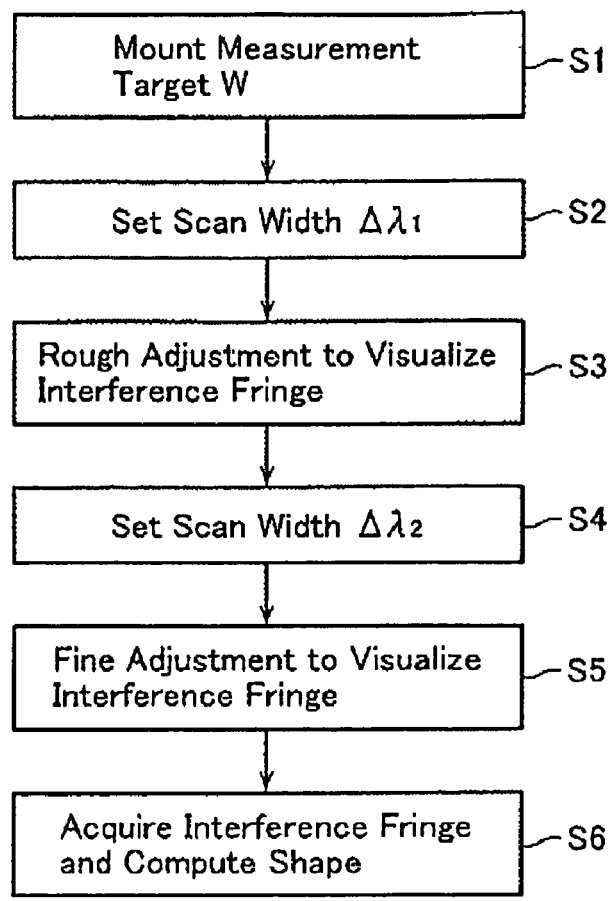
FIG. 2 is a flowchart illustrative of a method of adjusting the position of a measuring object W in the interferometer 200 of the first embodiment.

A method of adjusting the position of the measuring object W in the interferometer 200 of this embodiment is described next with reference to a flowchart in FIG. 2.

Figure 3:
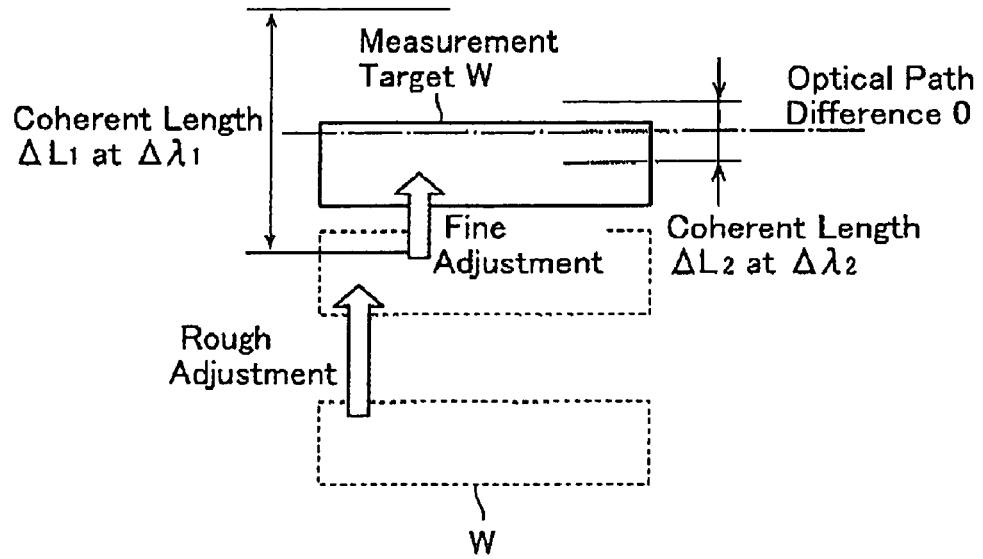
FIG. 3 is a conceptual view illustrative of the method of adjusting the position of the measuring object W in the interferometer 200 of the first embodiment.

The measuring object W is mounted on a mounting member, not shown, (S1), then the scan width of the wavelength $\lambda$ of the light emitted from the wavelength-variable light source 201 is set at $\Delta \lambda 1$, followed by wavelength scanning (S2). This $\Delta \lambda$ makes it possible based on the [Expression 1] to set the coherent length $\Delta L$ at a distance that allows for rough adjustment of the measuring object W (see FIG. 3). The user moves the measuring object W to such a position that makes interference fringes observable, followed by rough adjustment of the position of the measuring object W (S3).

After completion of the rough adjustment, the scan width of the light $\lambda$ emitted from the wavelength-variable light source 201 is set at $\Delta \lambda 2$ larger than $\Delta \lambda 1$, followed by wavelength scanning (S4). This $\Delta \lambda 2$ makes it possible to set the coherent length $\Delta L$ at a short coherent length L2 that satisfies $\Delta L2 < 2nt$ where n denotes a refractive index, and t a thickness of the measuring object W (see FIG. 3). The user moves the measuring object W to such a position that makes interference fringes observable, followed by fine adjustment of the position of the measuring object W (S5).

After completion of the fine adjustment, it is possible at that position to observe interference fringe images while suppressing undesired interference due to the reflection from the rear surface of the measuring object W, thereby achieving accurate measurement of interference fringes (S6). In this way, the scan width of the wavelength $\lambda$ is varied such that the coherent length is shortened stepwise as $\Delta L1$, $\Delta L2$ while the position of the measuring object W is adjusted. As a result, the adjustment of the position can be completed more easily than the adjustment of the position performed with a coherent length that is short from the beginning. This is effective to execute measurement of interference fringes with suppressed rear-surface reflection noises. In this example the coherent length $\Delta L$ is described as varied in two steps but not limited to this. For example, $\Delta L$ may be varied in three or more steps.

Figure 4:
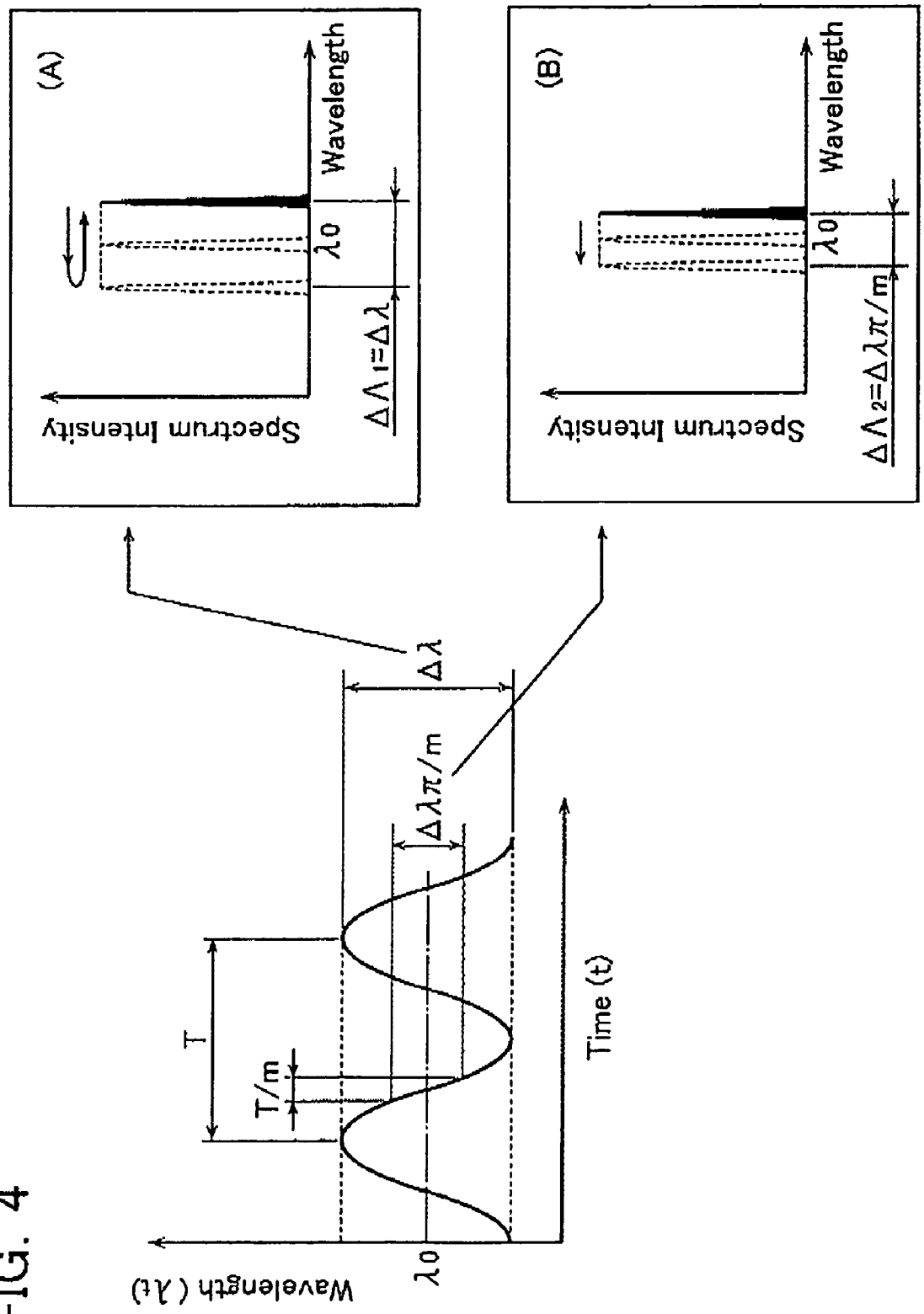
FIG. 4 is an illustrative view of an integration time to a modulation period and a wavelength width on integrating reception of light when the oscillation wavelength is modulated in the interferometer 200 of the first embodiment.
Figure 5:
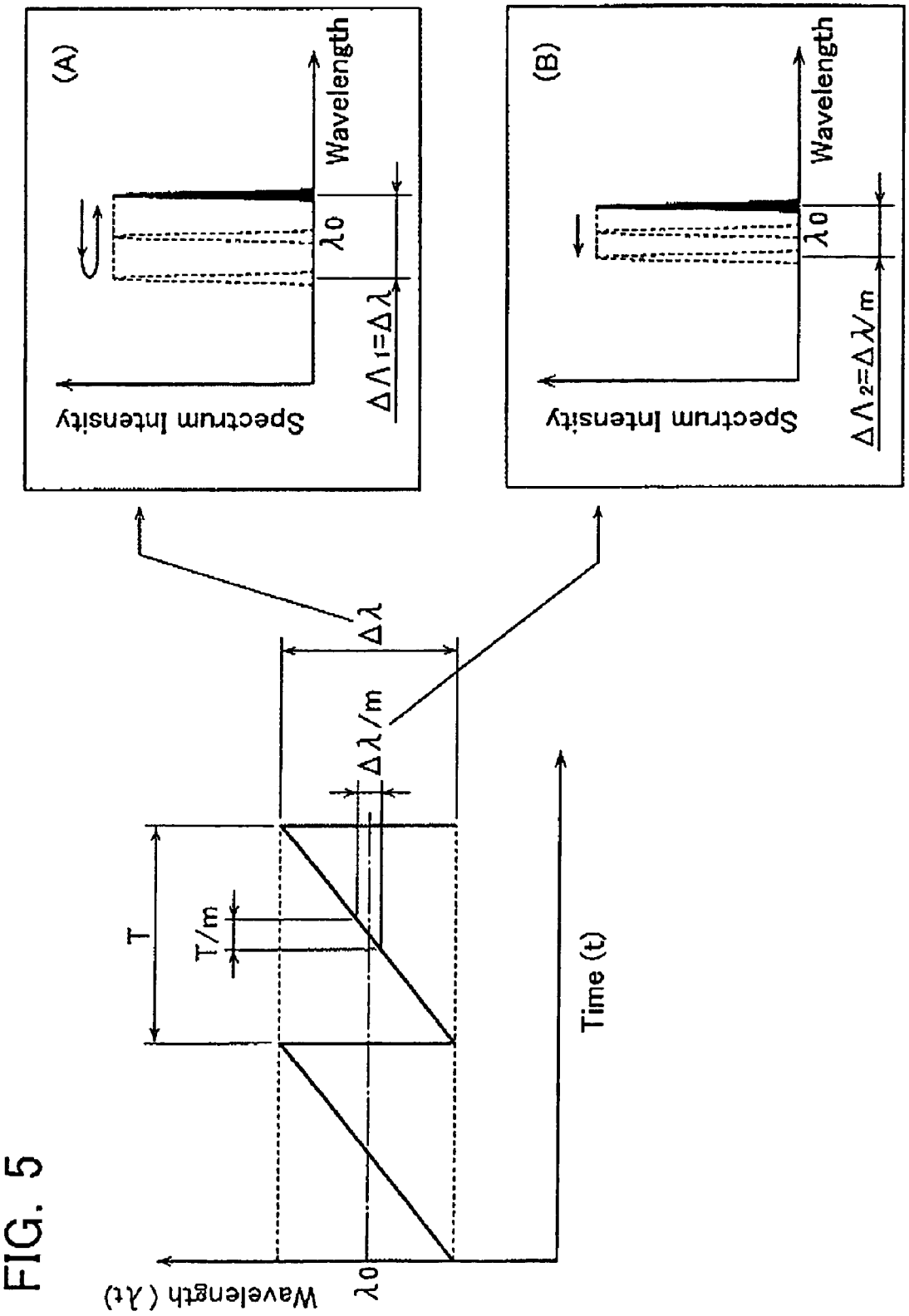
FIG. 5 is an illustrative view of an integration time to a modulation period and a wavelength width on integrating reception of light when the oscillation wavelength is modulated with another function in the interferometer 200 of the first embodiment.

FIGS. 4 and 5 are referenced next to describe a method for integrating reception of light on measurement of interference fringes formed by the light scanned in the above-described wavelength scan width $\Delta \lambda$, and examples thereof.

First, the oscillation wavelength $\lambda(t)$ of the wavelength-variable light source is modulated periodically as described above. For example, on modulation with a sinusoidal wave as shown in FIG. 4, the oscillation wavelength $\lambda(t)$ is represented as a function of time t by the following expression.

$$\lambda(t) = \lambda_0 + \frac{\Delta \lambda}{2} \cos(2\pi \omega \cdot t) \qquad \text{[Expression 6]}$$

where $\Delta \lambda$ denotes a wavelength scan width (for wavelength scanning within $\pm \Delta \lambda / 2$ about the wavelength $\lambda_0$), and $\omega$ a modulation frequency of the wavelength of the light source (a reciprocal of a variation period T of the wavelength $\lambda$). Details are described below. As the oscillation wavelength $\lambda(t)$ varies periodically, rough adjustment requires a reduction in the wavelength scan width $\Delta \lambda$. Alternatively, it requires integrating reception of light performed at such timing that reduces the variations in wavelength. On the other hand, fine adjustment requires an increase in the wavelength scan width $\Delta \lambda$. Alternatively, it requires integrating reception of light performed at such timing that increases the variations in wavelength. As a result, it is possible to achieve selective reception of light with a wavelength scan width suitable for the coherent lengths in respective adjustment modes.

A received wavelength variation width $\Delta \Lambda$ in integrating reception of light modulated with a certain reception time of light, $\Delta t$, for example, in a zone in which the wavelength monotonously increases or decreases may be represented by the following [Expression 7].

$$\Delta \Lambda = \lambda(t + \Delta t) - \lambda(t) \qquad \text{[Expression 7]}$$
$$= \frac{\Delta \lambda}{2} \cos\{2\pi \omega (t + \Delta t)\} - \frac{\Delta \lambda}{2} \cos(2\pi \omega \cdot t)$$

In a word, the wavelength-variable light source 201 emits light with the wavelength modulation width $\Delta \lambda$ shown in [Expression 6] while the CCD camera 209 acquires interference fringe images in the received wavelength variation width $\Delta \Lambda$ shown in [Expression 7].

If $\Delta t \ll 1/\omega$, then $\Delta \Lambda$ shown in [Expression 7] is represented approximately by [Expression 8] as a received wavelength variation width $\Delta \Lambda'$ in a very small time variation.

$$\Delta \Lambda' \approx \frac{\Delta \lambda}{2} \left[\frac{d\lambda}{dt}\right] \Delta t = -\frac{\Delta \lambda}{2} 2\pi \omega \sin(2\pi \omega t) \cdot \Delta t \qquad \text{[Expression 8]}$$

If the timing t for integrating reception of light is set in the vicinity of the time shown in the following [Expression 9], that is, in the vicinity of the time t that realizes $\lambda(t) = \lambda_0$, then the [Expression 8] can be simplified as [Expression 10].

$$t = \frac{1}{4\omega} \cdot n \qquad \text{[Expression 9]}$$
$$n = 1, 2, \ldots$$

$$\Delta \Lambda' = |-\Delta \lambda \pi \omega \Delta t| \qquad \text{[Expression 10]}$$

The reception time of light, that is, the shutter time of the CCD camera 209 may be denoted with $\Delta t$. In this case, if $\Delta t$ is equal to 1/m the modulation period T as in [Expression 11] shown below, then the received wavelength variation width $\Delta \Lambda'$ in a very small time variation is represented by [Expression 12] shown below.

$$\Delta t = \frac{T}{m} = \frac{1}{m} \cdot \frac{1}{\omega}$$ [Expression 11]

$$\Delta \Lambda' \approx \frac{\Delta \lambda \pi}{m}$$ [Expression 12]

Namely, integrating reception of light at the CCD camera 209 over time of the modulation period T makes the received wavelength variation width $\Delta\Lambda_1 = \Delta\lambda$ as shown in FIG. 4(A), and allows for integrating reception of light having wavelengths within the whole wavelength variation width $\Delta\lambda$. In contrast, integrating reception of light at the timing requiring the time of T/m about the wavelength $\lambda_0$ makes the received wavelength variation width $\Delta\Lambda_2 = \Delta\lambda\pi/m$ as shown in FIG. 4(B). In a word, selective integrating reception of light within a specific wavelength region at certain timing allows for integrating reception of light having wavelength variation widths corresponding to the rough adjustment mode and the fine adjustment mode in accordance with the coherent length.

On the other hand, the oscillation wavelength may be modulated in a function linearly varying over time t as shown in FIG. 5, such as a sawtooth function, instead of modulating over time t in a sinusoidal function as shown in FIG. 4. The reception time of light, $\Delta t$, may be multiplied by 1/m the period T. In this case, as shown in FIG. 5(A), the received wavelength variation width $\Delta\Lambda_2$ can be given a 1/m-times shorter wavelength region compared to the received wavelength variation width $\Delta\Lambda_1$ for integrating reception of light over the period T (FIG. 5(B)).

The modulation of the oscillation wavelength in the sinusoidal function as in FIG. 4 is herein compared with the linear modulation of the oscillation wavelength as in FIG. 5 over the same reception time of light. In this case, the integrating reception of light about the wavelength $\lambda_0$ in the modulation of the oscillation wavelength in the sinusoidal function allows for integrating reception of light in a wavelength zone $\pi$-times wider compared to the linear modulation of the oscillation wavelength. In a word, this is an extremely effective method when the wavelength of the light source can not be modulated in a period T sufficiently shorter than the integrating reception time of light, $\Delta t$, even though it is intended to shorten the coherent length.

As described above, the periodic modulation of the oscillation wavelength and the selective integrating reception of light only in a partial zone within one period allow for integrating reception of light within a desired wavelength region in a short time. Accordingly, selective reception of light can be performed within a wavelength region corresponding to the coherent length. Further, selective reception of light at the timing that maximizes the amount of wavelength variation per unit time (the center $\lambda_0$ in the case of the sinusoidal wavelike modulation) allows for more efficient integrating reception of light. As integrating reception of light in a short time can be made possible, interference fringes to be imaged are prevented from blurring and clear interference fringes can be obtained without occurrences of interference noises even under the vibrating condition.

This method makes it possible, with the use of a light source that can be modulated at a high frequency, to employ a faster shutter on imaging interference fringes. On the other hand, it is difficult to achieve a higher modulation frequency for a diffracted light feedback semiconductor laser of the external resonator type that uses a mechanical drive mechanism for wavelength modulation. When such laser light is used as a light source, this method works as an extremely effective means because it is possible to perform integrating reception of light in a shorter time than the modulation period.

SECOND EMBODIMENT

Figure 6:
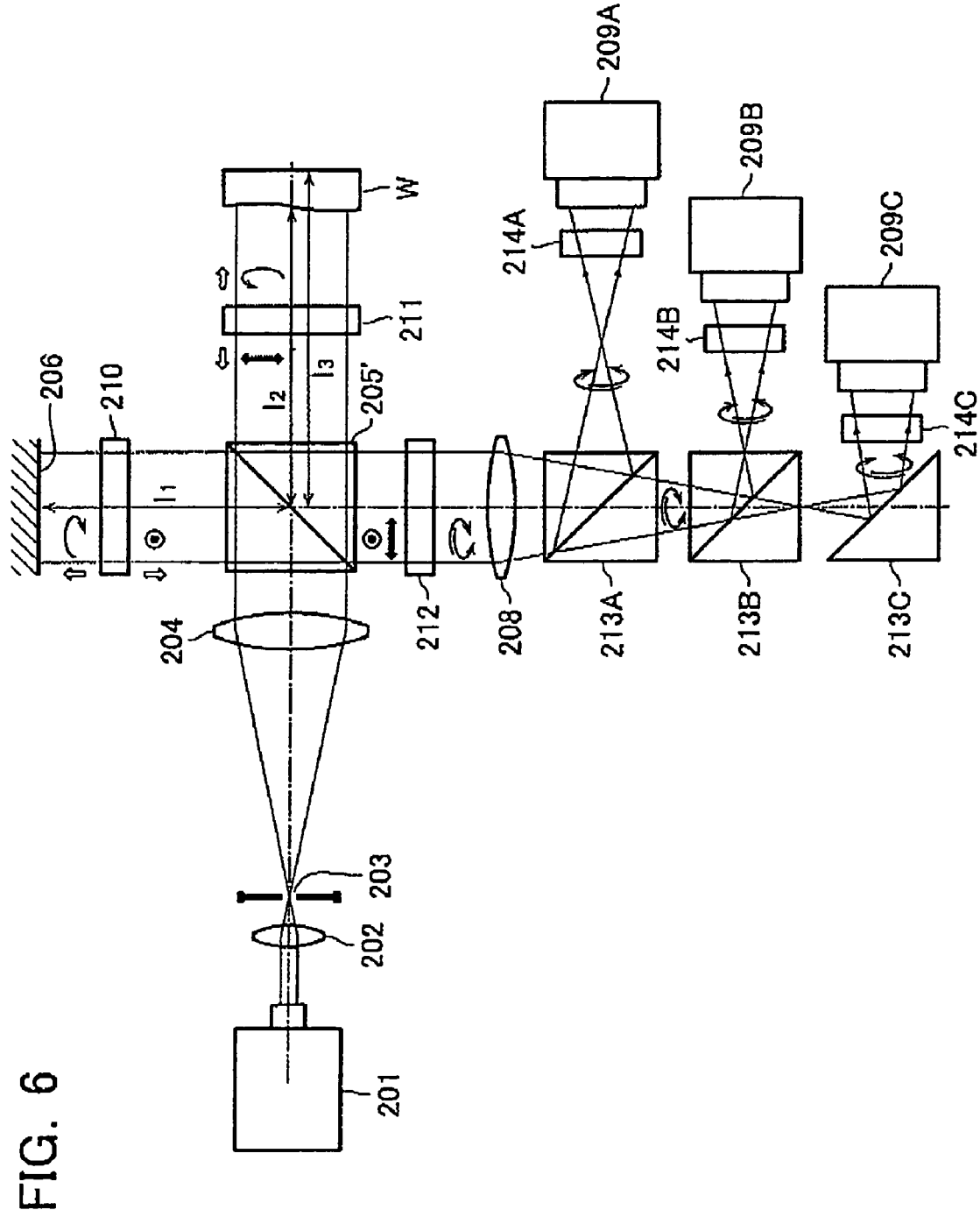
FIG. 6 is a schematic diagram of a configuration of an interferometer 200 according to a second embodiment of the present invention.

An interferometer according to a second embodiment of the present invention is described next with reference to FIG. 6. Elements in FIG. 6 in common with those in the first embodiment are given the same or corresponding reference numerals and omitted from the following detailed description. The interferometer of this embodiment is such an interferometer that acquires interference fringes having optically different phase differences at the same time to execute a phase shifting method, different from the first embodiment.

The light emitted from the wavelength-variable light source 201 is split through a polarizing beam splitter 205' into orthogonal, linearly polarized lights: a measurement light and a reference light. The measurement light and the reference light are converted from linearly polarized lights into circularly polarized lights through a ¼-wavelength plate 210 and a ¼-wavelength plate 211, and then reflected from the measuring object W and the reference surface 206, respectively. The reflected measurement and reference lights are converted through the ¼-wavelength plates 210, 211 into orthogonal, linearly polarized lights, which have a direction of vibration different by 90 degrees from that at the time of incidence, and then synthesized through the polarizing beam splitter 205. The synthesized light is converted through a ¼-wavelength plate 212 into a synthesized light of a counterclockwise, circularly polarized light and a clockwise, circularly polarized light.

The interferometer also comprises a light splitting member, which includes beam splitters 213A, 213B and a reflecting prism 213C. The light splitting member splits light into three split lights, which are projected through three polarizing plates 214A-C onto three CCD cameras 209A-C, respectively.

Figure 7:
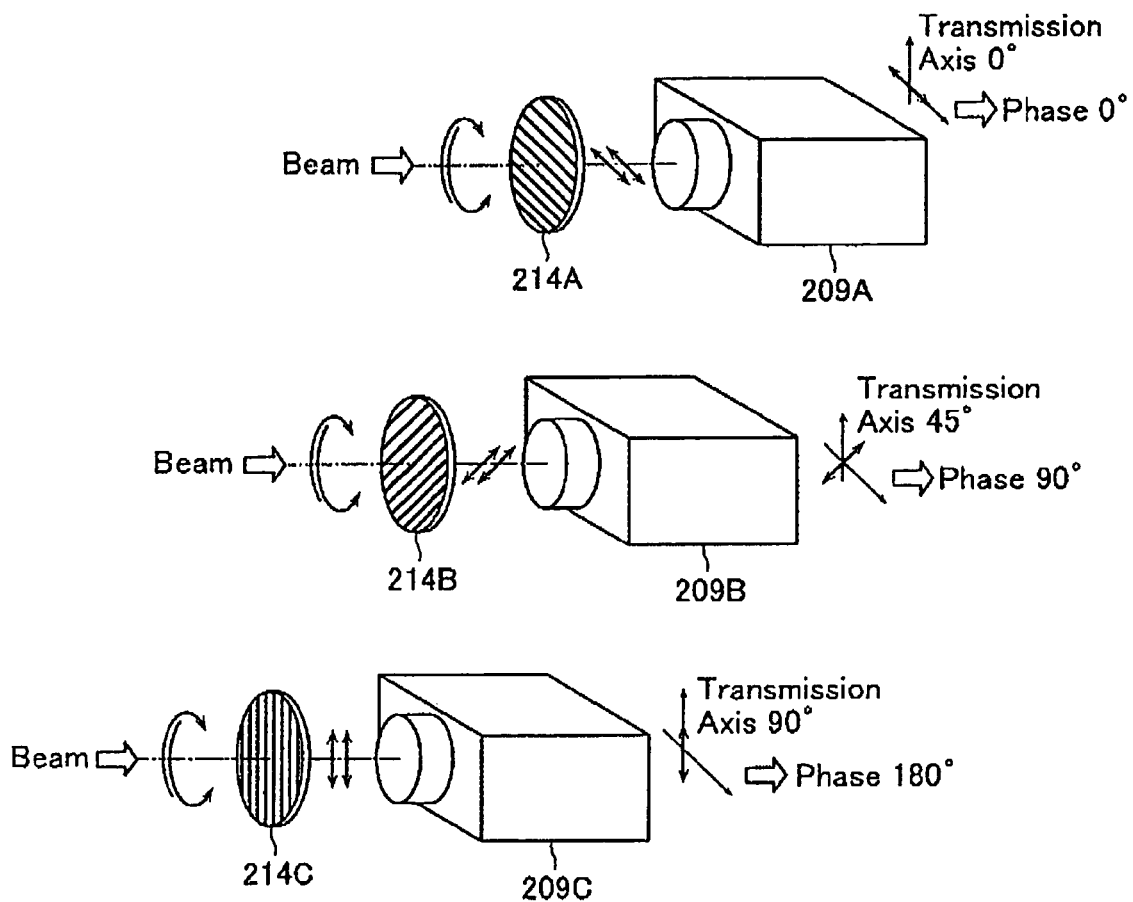
FIG. 7 shows configurations of polarizing plates 214A-C of FIG. 6.

The polarizing plates 214A-C have the directions of transmission axes different by 45 degrees from each other as 0°, 45°, 90° such that the three split lights passing through the polarizing plates have phases different by 90 degrees from each other (0°, 90°, 180°) as shown in FIG. 7. If interference fringes caused by the three split lights have equal biases and amplitudes at corresponding points, the following arithmetic procedure can be applied to measure the shape of the measuring object. This procedure derives a difference between image signals of interference fringe images formed by the three split lights, and obtains a cosine signal S and a sine signal C, and then calculates an arctangent of S/C, arctan (S/C). This makes it possible to specify the phase difference between the reference light and the measurement light, thereby measuring the shape of the measuring object. It is possible for the interferometer of this embodiment to image a plurality of phase-shifted interference fringes instantaneously even if no movable portion such as displacement of the reference surface 206 is provided. Therefore, compared to the first embodiment, further accurate measurements can be executed.

In this embodiment, the polarizing beam splitter 205' and the ¼-wavelength plates 210, 211 are employed to polarize and split light Alternatively, a non-polarizing half-mirror, a polarizing plate or the like may be substituted to extract a polarized light in a specific direction. Such a method is also available.

THIRD EMBODIMENT

Figure 8:
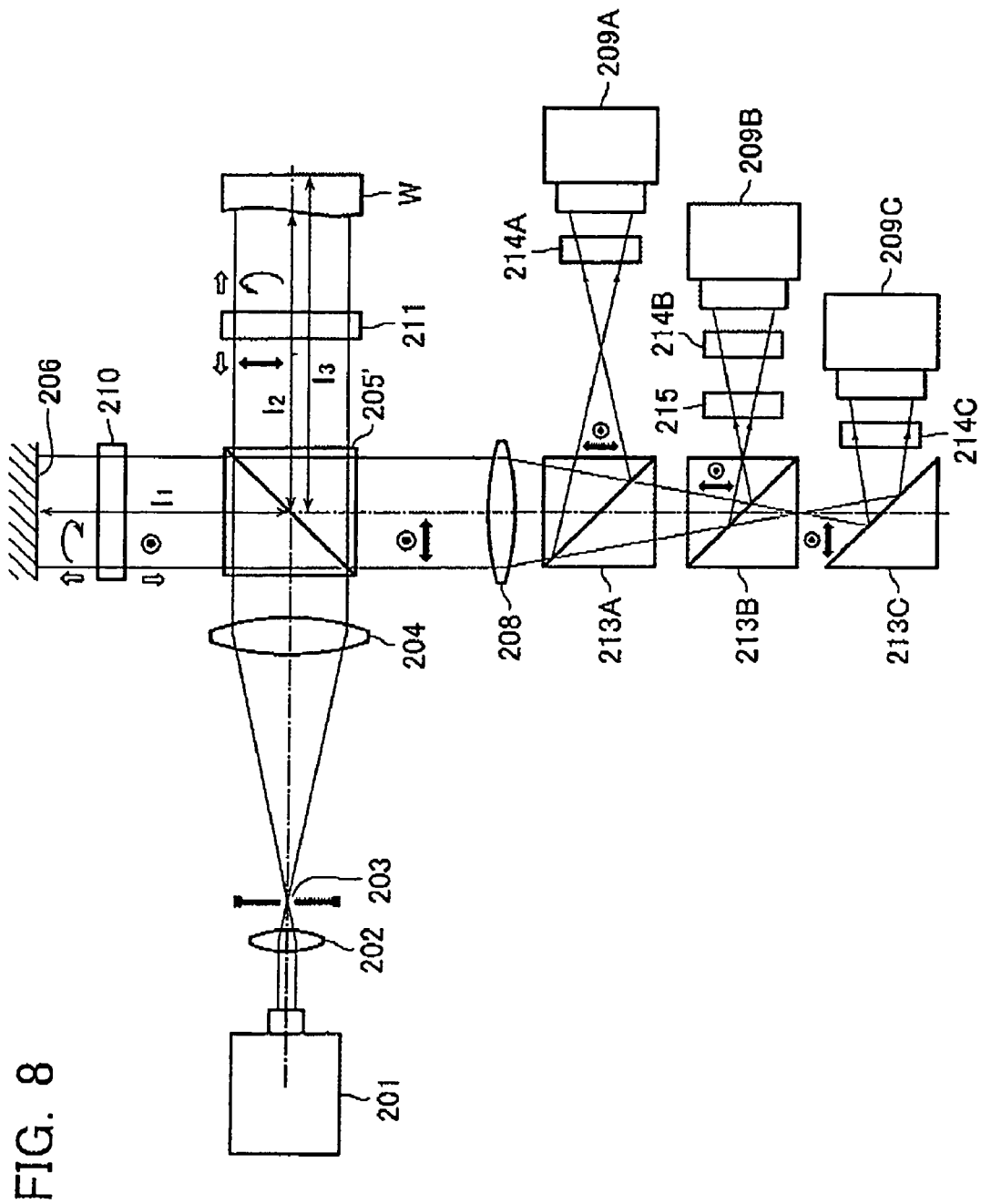
FIG. 8 is a schematic diagram of a configuration of an interferometer 200 according to a third embodiment of the present invention.

An interferometer according to a third embodiment of the present invention is described next with reference to FIG. 8. The interferometer according to this embodiment is also an interferometer that uses a phase shifting method, like the second embodiment. Different from the second embodiment, the ¼-wavelength plate 212 between the polarizing beam splitter 205' and the beam splitter 213A is omitted while a ¼-wavelength plate 215 is newly arranged in front of the polarizing plate 214B. The ¼-wavelength plate 215 has a fast axis orientation and a slow axis orientation, which are made coincident with the polarizing directions of the reference light and the measurement light, thereby providing a relative phase difference of 90° between the reference light and the measurement light.

Figure 9:
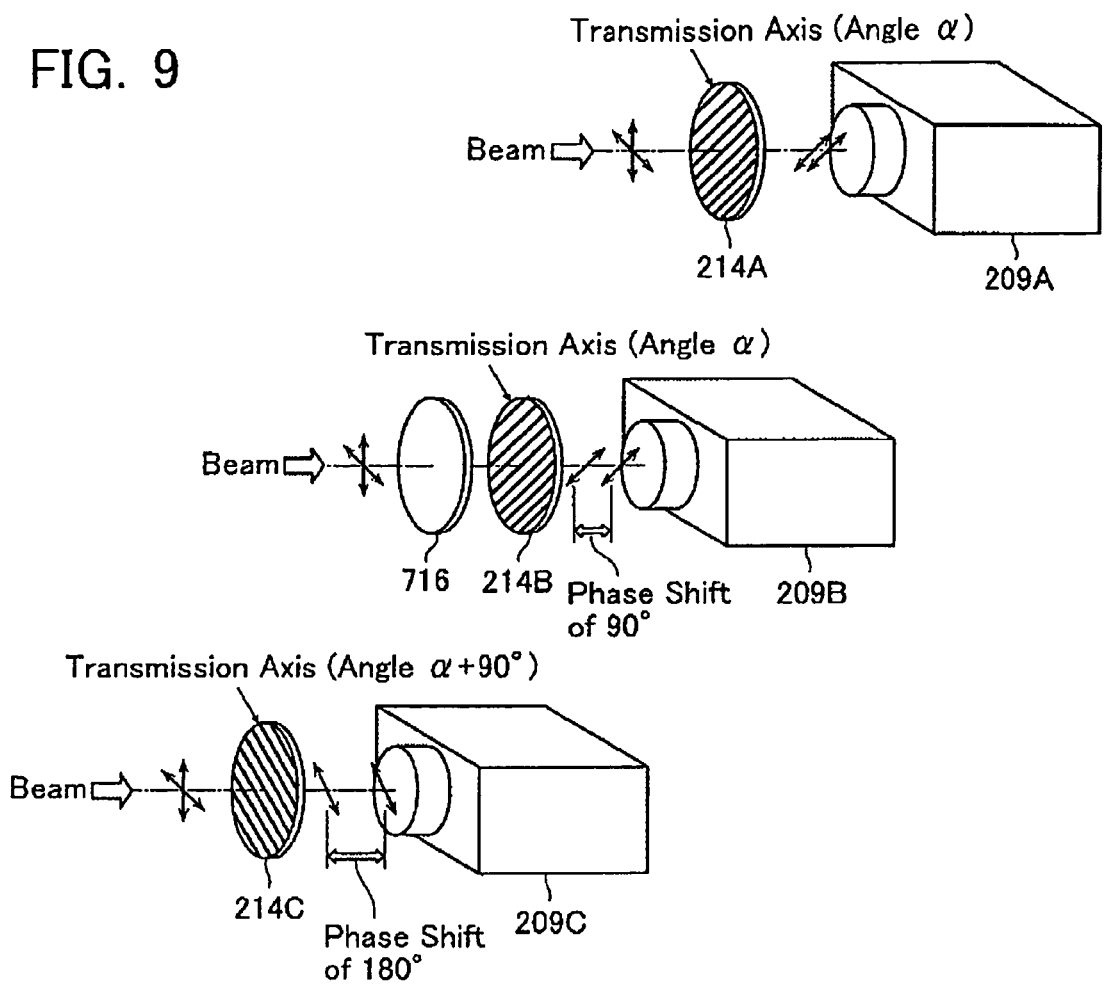
FIG. 9 shows configurations of polarizing plates 214A-C and a ¼-wavelength plate 215 of FIG. 8.

The polarizing plates 214A, 214B, 214C have respective transmission axes set at angles of α, α, α+90° as shown in FIG. 9. The angle α may have any orientation unless it is quite identical to the orientations of the reference light and the measurement light. This configuration enables the CCD cameras 209A, 209B, 209C to capture interference fringe images with the respective amounts of phase shift 0°, 90°, 180°.

The embodiments of the invention have been described above though the present invention is not limited to these embodiments but rather can be given various modifications, additions, substitutions, and so forth without departing from the scope of the invention. For example, the above embodiments describe the interferometer with the use of the optical phase shifting method though the present invention is also applicable to an interferometer that moves the reference surface for phase shifting, and an interferometer with the use of the Fourier transform. A plurality of CCD cameras 209A-C are prepared in the described examples, which are though not limiting ones. Rather, only a single CCD camera is sufficient for imaging if an optical path switcher is used for switching.

Figure 10:
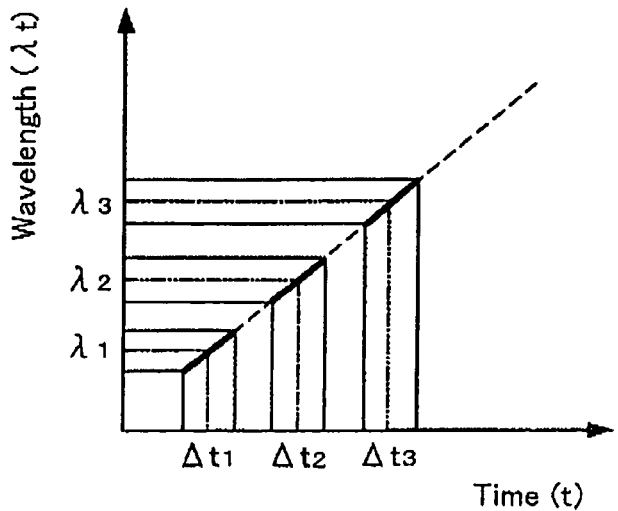
FIG. 10 is a schematic diagram representing a wavelength modulation function as well as timing for integrating reception of light when interference fringes are phase-shifted in the interferometer 200 of the first embodiment.

In the interferometer 200 shown in FIG. 1, the wavelength-variable light source 201 may be modulated as shown in FIG. 10 for integrating reception of a plurality of interference fringes at time intervals Δt1, Δt2 while varying the central wavelength. In this case, the integrating reception reduces interference noises caused by the reflected light from the rear surface of the target. Further, from the relation between the optical path lengths $l_1$ and $l_2$, the center wavelength varies to shift the phase of interference fringes caused by the light reflected from the target surface to be measured. In a word, only with control of wavelength modulation of the wavelength-variable light source 201 and imaging at the CCD camera 209, it is possible to achieve interference fringe analysis of a parallel glass substrate as a measuring object with the phase shifting method. The wavelength modulating function is not always linear. In addition, the timing of integrating reception of light and the number of images to be captured are not limited to those in the method of FIG. 10 but rather can be varied without departing from the scope of the invention.

What is claimed is:

1. An interferometer, comprising:
a wavelength-variable light source configured to emit a light with a variable wavelength;
a light splitting/synthesizing member operative to split the light from the wavelength-variable light source into a measurement light to be led to a measuring object and a reference light to be led to a reference surface, and to synthesize the reference light reflected from the reference surface and the measurement light reflected from the measuring object to provide a synthesized light;
an imaging unit operative to image an interference fringe image formed of the synthesized light in a certain exposure time;
a controller operative to control the wavelength-variable light source to vary the wavelength of the emitted light within a certain wavelength range in the certain exposure time; and
a shape computation unit operative to analyze the interference fringe image integrated in relation to the variations in wavelength within the certain wavelength range to compute the shape of the measuring object;
characterized in that the wavelength-variable light source is operative to vary the center wavelength of the emitted light in a periodic function, and the imaging unit performs selective integrating reception of light in a partial time zone within one period of the periodic function.

2. The interferometer according to claim 1, wherein the controller is operative to determine a wavelength variation range in the certain exposure time based on an optical path difference between the reference light and the measurement light caused by the position of the measuring object to be determined.

3. The interferometer according to claim 1, wherein the controller is operative to determine the wavelength variation range larger in fine adjustment of the position of the measuring object and in measurement than in rough adjustment of the position of the measuring object.

4. The interferometer according to claim 1, further comprising:
a light splitting member operative to split the synthesized light into a plurality of split lights; and
a plurality of phase shifting optical members operative to provide a certain phase difference between the split lights,
wherein the imaging unit is configured to image a plurality of interference fringe images formed by the split lights provided with the phase difference.

5. The interferometer according to claim 4, wherein the light splitting member is operative to split the light received from the wavelength-variable light source into the measurement light and the reference light that are orthogonal, linearly polarized lights,
the phase shifting optical members including
a ¼-wavelength plate operative to convert orthogonal, linearly polarized lights in the synthesized light into a counterclockwise, circularly polarized light and a clockwise, circularly polarized light, and
a plurality of polarizing plates having polarization axes different from each other and interposed in the optical paths of the split lights split by the light splitting member.

6. The interferometer according to claim 4, wherein the light splitting member is operative to split the light received from the wavelength-variable light source into the measurement light and the reference light that are orthogonal, linearly polarized lights,
the phase shifting optical members including
a first polarizing plate interposed in an optical path of a first split light split by the light splitting member and having a first polarization axis,
a second polarizing plate interposed in an optical path of a second split light split by the light splitting member and having a second polarization axis identical to the first polarization axis,
a third polarizing plate interposed in an optical path of a third split light split by the light splitting member having a third polarization axis with a difference of 90° from the first polarization axis, and a ¼-wavelength plate interposed in the optical path of the second split light, with polarized directions of the synthesized light almost coincident with an advanced-phase axis direction and a lagged-phase axis orientation.

7. The interferometer according to claim 1, wherein the partial time zone of the periodic function is a time zone that includes the maximum amount of variation on the periodic function.

8. The interferometer according to claim 1, wherein the periodic function is a sinusoidal wave function.

9. The interferometer according to claim 1, wherein the shape computation unit is operative to compute the shape from the interference fringe image with an interference fringe analysis approach such as the Fourier transform.

10. The interferometer according to claim 1, wherein the shape computation unit is operative to compute the shape with a phase shifting method, while moving either the reference surface or the measuring object, otherwise arranging a phase-delaying optical medium in the optical path of the reference light or the measurement light, to provide a relative phase difference between the reference light and the measurement light.

11. The interferometer according to claim 1, wherein the shape computation unit is operative to compute the shape while the imaging unit performs selective integrating reception of light in the partial time zone of the periodic function within different wavelength ranges to image a plurality of phase-shifted interference fringes.

12. A shape measuring method, comprising:
emitting a light while giving variations in wavelength;
splitting the light into a measurement light to be led to a measuring object and a reference light to be led to a reference surface;
synthesizing the reference light reflected from the reference surface and the measurement light reflected from the measuring object to provide a synthesized light;
imaging an interference fringe image formed of the synthesized light in a certain exposure time;
controlling the wavelength-variable light source to vary the wavelength of the emitted light within a certain wavelength range in the certain exposure time; and
analyzing the interference fringe image integrated in relation to the variations in wavelength within the certain wavelength range to compute the shape of the measuring object;
characterized in that the light emitted while giving variations in wavelength is subjected to selective integrating reception of light in a partial time zone within one period of a periodic function by the imaging unit while the center wavelength of the light is varied in the periodic function.

13. The shape measuring method according to claim 12, comprising determining a wavelength variation range in the certain exposure time based on an optical path difference between the reference light and the measurement light caused by the position of the measuring object to be determined.

14. The shape measuring method according to claim 12, comprising determining the wavelength variation range larger in fine adjustment of the position of the measuring object and in measurement than in rough adjustment of the position of the measuring object.

15. The shape measuring method according to claim 12, further comprising:
splitting the synthesized light into a plurality of split lights; and
providing a certain phase difference between the split lights,
wherein the step of imaging in the certain exposure time includes imaging a plurality of interference fringe images formed by the split lights provided with the phase difference.

16. The shape measuring method according to claim 12, wherein the partial time zone of the periodic function is a time zone that includes the maximum amount of variation on the periodic function.

17. The shape measuring method according to claim 12, wherein the periodic function is a sinusoidal wave function.

18. The shape measuring method according to claim 12, wherein the shape computation unit is operative to compute the shape while the imaging unit performs selective integrating reception of light in the partial time zone of the periodic function within different wavelength ranges to image a plurality of phase-shifted interference fringes.

* * * * *